UNITED STATES PATENT OFFICE.

FREDERICK C. GRANGE, OF BALTIMORE, MARYLAND.

IMPROVEMENT IN FERTILIZERS.

Specification forming part of Letters Patent No. 200,189, dated February 12, 1878; application filed March 2, 1877.

*To all whom it may concern:*

Be it known that I, FREDERICK C. GRANGE, of Baltimore city, in the State of Maryland, have invented a new and useful Fertilizer, of which the following is a specification:

The object of my invention, like that of all fertilizers, is to return to the soil those elements which plants absorb, or to give to the soil what may be lacking from natural causes.

My invention aims to effect these results in the quickest and most convenient manner with the least possible expense.

I produce my fertilizer by combining tripoli with the salt of potash called "kainit," or other potash salts.

I take tripoli and kainit in equal proportions, and mix. This may be used alone, or the farmer may combine it with auxiliary ingredients, such as phosphates, ammoniacal matter, farm-manure, &c., according to the soil or the crops intended to be raised.

Tripoli is well known both as to its nature and qualities.

Kainit is a native salt from the Stassfurt mines in Prussia, in great reputation and extensive use in Europe and America as a most valuable fertilizing substance. Its elements are essential to the growth of wheat, tobacco, corn, hops, clover, potatoes, grass, vines, fruits, trees, asparagus, and roots of all kinds.

When the particular crop or the nature of the soil requires ammonia, I may add the same to my compound.

I claim—

The admixture of tripoli and kainit, forming a fertilizer, as described.

In testimony whereof I have hereunto set my hand.

FREDERICK C. GRANGE.

Witnesses:
ROWLAND R. HAYWARD.
DAVID HERBERT.